US006752068B2

(12) United States Patent
Onishi et al.

(10) Patent No.: US 6,752,068 B2
(45) Date of Patent: Jun. 22, 2004

(54) HIGH PRESSURE FUEL SUPPLY APPARATUS

(75) Inventors: Yoshihiko Onishi, Tokyo (JP); Takuya Uryu, Tokyo (JP); Yuta Ichinose, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/286,836

(22) Filed: Nov. 4, 2002

(65) Prior Publication Data

US 2003/0221552 A1 Dec. 4, 2003

(30) Foreign Application Priority Data

May 28, 2002 (JP) .................................... P 2002-153801

(51) Int. Cl.[7] ................................................ F16J 15/18
(52) U.S. Cl. ........................................................ 92/168
(58) Field of Search ............................ 92/168; 277/435, 277/436, 437, 438, 470, 560

(56) References Cited

U.S. PATENT DOCUMENTS 5,567,134 A * 10/1996 Inoue ......................... 417/490
5,752,430 A * 5/1998 Kawajiri et al. .............. 92/129
6,530,759 B2 * 3/2003 Sano et al. .................... 92/168

FOREIGN PATENT DOCUMENTS

| | | |
|---|---|---|
| JP | 3199105 | 6/2001 |
| JP | 2001-295720 | 10/2001 |

* cited by examiner

*Primary Examiner*—Edward K. Look
*Assistant Examiner*—Michael Leslie
(74) *Attorney, Agent, or Firm*—Sughrue Mion, PLLC

(57) ABSTRACT

A high pressure fuel supply apparatus 6 has a plunger 161 reciprocating and sliding in a sleeve 160 of a high pressure fuel pump 16 to form a fuel pressurizing chamber 163 between the plunger 161 and the sleeve 160 to discharge pressurized fuel; a bolt 180 forming a part of a housing of the high pressure fuel pump 16; and an oil seal 169 fixed to an inner wall surface of the bolt 180 by press fitting to slide on an outer circumferential wall of the plunger 161 in accordance with reciprocating motion of the plunger 161 to seal the fuel and lubricating oil; wherein the bolt 180 is formed so that a press-in load in a second half of a press-in stroke of the seal 169 is higher than that in a first half thereof in an abutment portion of the bolt 180 against the seal 169.

4 Claims, 9 Drawing Sheets

HIGH PRESSURE FUEL SUPPLY APPARATUS

BACKGROUND OF THE INVENTION

1. Field of the Invention

The present invention relates to a high pressure fuel supply apparatus chiefly for use in a cylinder fuel injection engine or the like.

2. Description of the Related Art

FIG. 10 is a configuration diagram showing a fuel supply system in an internal combustion engine for a vehicle, including a related-art high pressure fuel supply apparatus. In FIG. 10, fuel 2 in a fuel tank 1 is delivered from the fuel tank 1 by a low pressure pump 3, passed through a filter 4, adjusted in pressure by a low pressure regulator 5, and then supplied to a high pressure fuel supply apparatus 6 which is a high pressure pump. Only a flow rate of the fuel 2 required for fuel injection is boosted by the high pressure fuel supply apparatus 6, and supplied into a delivery pipe 9 of a not-shown internal combustion engine. A surplus of the fuel 2 is relieved between a low pressure damper 12 and a suction valve 13 by an electromagnetic valve 17.

In addition, the required fuel flow rate is determined by a not-shown control unit, which also controls the electromagnetic valve 17. The high pressure fuel supplied thus is injected into a cylinder of the internal combustion engine in the form of high pressure mist from a fuel injection valve 10 connected to the delivery pipe 9. When abnormal pressure (high relief valve opening pressure) is placed in the delivery pipe 9, a filter 7 and a high pressure relief valve 8 are opened to prevent the delivery pipe 9 from being broken.

The high pressure fuel supply apparatus 6 which is a high pressure pump, has a filter 11 for filtering the supplied fuel, a low pressure damper 12 for absorbing the pulsation of the low pressure fuel, and a high pressure fuel pump 16 for pressurizing the fuel supplied through the suction valve 13 and discharging the high pressure fuel through a discharge valve 14.

FIG. 11 is a sectional view showing a related-art high pressure fuel supply apparatus. In FIG. 11, the high pressure fuel supply apparatus 6 has a casing 61, a high pressure fuel pump 16, an electromagnetic valve 17, and a low pressure damper 12, integrally. The high pressure fuel pump 16 is a plunger pump provided in the casing 61.

A fuel pressurizing chamber 163 surrounded by a sleeve 160 and a plunger 161 inserted slidably in the sleeve 160 is formed in the high pressure fuel pump 16. The other end of the plunger 161 abuts against a tappet 164, and the tappet 164 abuts against a cam 100 so as to drive the high pressure fuel pump 16. The cam 100 is provided integrally or coaxially with a cam shaft 101 of the engine so as to reciprocate the plunger 161 along the profile of the cam 100 in cooperation with the rotation of a crank shaft of the engine. The volume of the fuel pressurizing chamber 163 is changed by the reciprocating motion of the plunger 161 so that the fuel boosted to high pressure is discharged from the discharge valve 14.

In the high pressure fuel pump 16, a plate 162, the suction valve 13 and the sleeve 160 are held between the casing 61 and an end surface of a spring guide 165, and fastened with a bolt 180. The plate 162 forms a fuel suction port 162*a* for sucking fuel from the low pressure damper 12 to the fuel pressurizing chamber 163, and a fuel-discharge port 162*b* for discharging the fuel from the fuel pressurizing chamber 163.

The suction valve 13 shaped into a thin plate is formed in the fuel suction port 162*a*. The discharge valve 14 is provided on the fuel discharge port 162*b* so as to communicate with the delivery pipe 9 through a high pressure fuel discharge passageway 62 provided in the casing 61. In addition, in order to suck fuel, a spring 167 for pushing the plunger 161 down in a direction to expand the fuel pressurizing chamber 163 is disposed in the state where the spring 167 has been compressed between the spring guide 165 and a spring holder 168. An oil seal 169 is provided to isolate the fuel in the fuel pressurizing chamber 163 from the lubricating oil of the engine.

The electromagnetic valve 17 has an electromagnetic valve body 170, a valve seat 173, a valve 174, and a compression spring 175. The electromagnetic valve body 170 is incorporated in the casing 61 of the high pressure fuel supply apparatus 6 so as to have a fuel channel 172 inside the electromagnetic valve body 170. The valve seat 173 is provided in the fuel channel 172 of the electromagnetic valve body 170. The valve 174 is held on/off the valve seat 173 in the electromagnetic valve body 170 so as to close/open the fuel channel 172. The compression spring 175 presses the valve 174 onto the valve seat 173.

At a point of time when a flow rate requested from a not-shown control unit has been discharged in a discharge stroke of the high pressure fuel pump 16, a solenoid coil 171 of the electromagnetic valve 17 is excited to open the valve 174. Thus, the fuel 2 in the fuel pressurizing chamber 163 is released to the low pressure side between the low pressure damper 12 and the suction valve 13 so that the pressure in the fuel pressurizing chamber 163 is reduced to be not higher than the pressure in the delivery pipe 9. Thus, the discharge valve 14 is closed. After that, the valve 174 of the electromagnetic valve 17 is opened till the high pressure fuel pump 16 proceeds to a suction stroke. The timing to open the electromagnetic valve 17 is controlled so that the amount of fuel discharged into the delivery pipe 9 can be adjusted.

However, the related-art high pressure fuel supply apparatus has problems as follows. FIG. 12 is an enlarged sectional view showing the vicinity of the oil seal in the high pressure fuel pump of the related-art high pressure fuel supply apparatus. As shown in FIG. 12, the oil seal 169 is constituted by an annular portion 169*a*, a seal portion 169*b* made of rubber, and a spring 169*c*. The annular portion 169*a* is fixed to the inner wall surface of the bolt 180 by press fitting. The seal portion 169*b* is fitted to one end of the annular portion 169*a* so as to slide on the outer circumferential wall of the plunger 161. The spring 169*c* is attached to the seal portion 169*b* so as to always press the outer circumferential wall of the plunger 161 at predetermined pressure. In addition, the other end of the annular portion 169*a* opposite to the seal portion 169*b* is formed as an open end 169*d*.

As for the method for manufacturing the oil seal 169, first, an adhesive agent is applied to the surface of the annular portion 169*a*. After that, the rubber seal portion 169*b* is bonded and fixed, by vulcanizing molding, to the edge of an insertion hole for the plunger 161 formed at one end of the annular portion 169*a*. At this time, the adhesive agent applied to the surface of the annular portion 169*a* also adheres to a portion abutting against the inner wall surface of the bolt 180. When the adhesive agent is dried, the adhesion state of the adhesive agent varies markedly. When press fitting is carried out in this state, there is a problem that a failure in sealing occurs in the abutment portion.

FIG. 13 is a graph showing the relationship between the press-in load and the press-in stroke of the oil seal 169. In FIG. 13, the ordinate designates the press-in load (kN), and the abscissa designates the press-in stroke. In addition, FIG. 14 is a graph showing the surface pressure distribution generated in the abutment portion between the oil seal 169 and the bolt 180. In FIG. 14, the ordinate designates the axial position of the abutment portion between the oil seal 169 and the bolt 180, and the abscissa designates the surface pressure (MPa).

As shown in FIG. 13, at the beginning of press fitting of the annular portion 169*a*, that is, at the beginning of a press-in stroke, a high press-in load is generated. After that, however, the press-in load is lowered with the advance of the press fitting, and then reaches a substantially constant value. This is because the annular portion 169*a* is formed out of a thin metal plate about 1 mm thick. That is, while the press-in load is generated at the beginning of the press fitting, the open end 169*d* side of the annular portion 169*a*, that is, the vicinity of a point B in FIG. 11 is deformed in the inner diameter in the second half of the press-in stroke, so that the press-in load is lowered. Thus, as shown in FIG. 14, the portion where high surface pressure is generated, that is, the seal position is formed near a point A. As a result, surface pressure required for sealing cannot be secured in the vicinity of the point B, so that seal function is hardly provided.

In addition, the adhesive agent adhering to the vicinity of the point B of the annular portion 169*a* is peeled off by sliding on the inner wall surface of the bolt 180 at the time of press fitting. However, the adhesive agent adhering to the vicinity of the point A of the annular portion 169*a* cannot obtain a high press-in load at the time of press fitting, and there is no press-in stroke. Thus, the adhesive agent not peeled off adheres to the surface of the annular portion 169*a* as it is. As a result, a gap produced due to variation in the adhesion state of the adhesive agent causes a failure in sealing.

As described above, there is a problem that a failure in sealing occurs in both the vicinity of the point A and the vicinity of the point B in the annular portion 169*a* so that the fuel and the lubricating oil of the engine cannot be sealed perfectly.

To solve such a problem, it can be considered to take measures to mold rubber not only in the seal portion 169*b* but also to reach the outer circumferential wall of the annular portion 169*a*. In this case, there arises a new problem that the annular portion 169*a* becomes sizable due to the rubber, the rubber is picked at the time of press fitting, or the rubber swells in liquid so as to interfere with other parts.

SUMMARY OF THE INVENTION

The invention is developed to solve the foregoing problems. It is an object of the invention to provide a high pressure fuel supply apparatus in which sealing properties between fuel and lubricating oil of an engine are improved.

According to the invention, there is provided a high pressure fuel supply apparatus having: a plunger reciprocating and sliding in a sleeve of a high pressure fuel pump so as to form a fuel pressurizing chamber between the plunger and the sleeve to thereby discharge pressurized fuel; a specified member forming a part of a housing of the high pressure fuel pump; and a seal member fixed to an inner wall surface of the specified member by press fitting so as to slide on an outer circumferential wall of the plunger in accordance with reciprocating motion of the plunger to thereby seal the fuel and lubricating oil; wherein the specified member is formed so that a press-in load in a second half of a press-in stroke of the seal member is higher than that in a first half thereof in an abutment portion of the specified member against the seal member.

Preferably, the specified member is formed into a tapered shape whose bore diameter varies continuously in the abutment portion of the specified member against the seal member.

Preferably, the specified member is formed to have an inner wall surface constituted of a plurality of different bore diameters in the abutment portion of the specified member against the seal member.

Preferably, the specified member has a smallest bore diameter in the second half of the press-in stroke of the seal member in the abutment portion of the specified member against the seal member.

DETAILED DESCRIPTION OF THE PREFERRED EMBODIMENTS (Embodiment 1)

Figure 1:
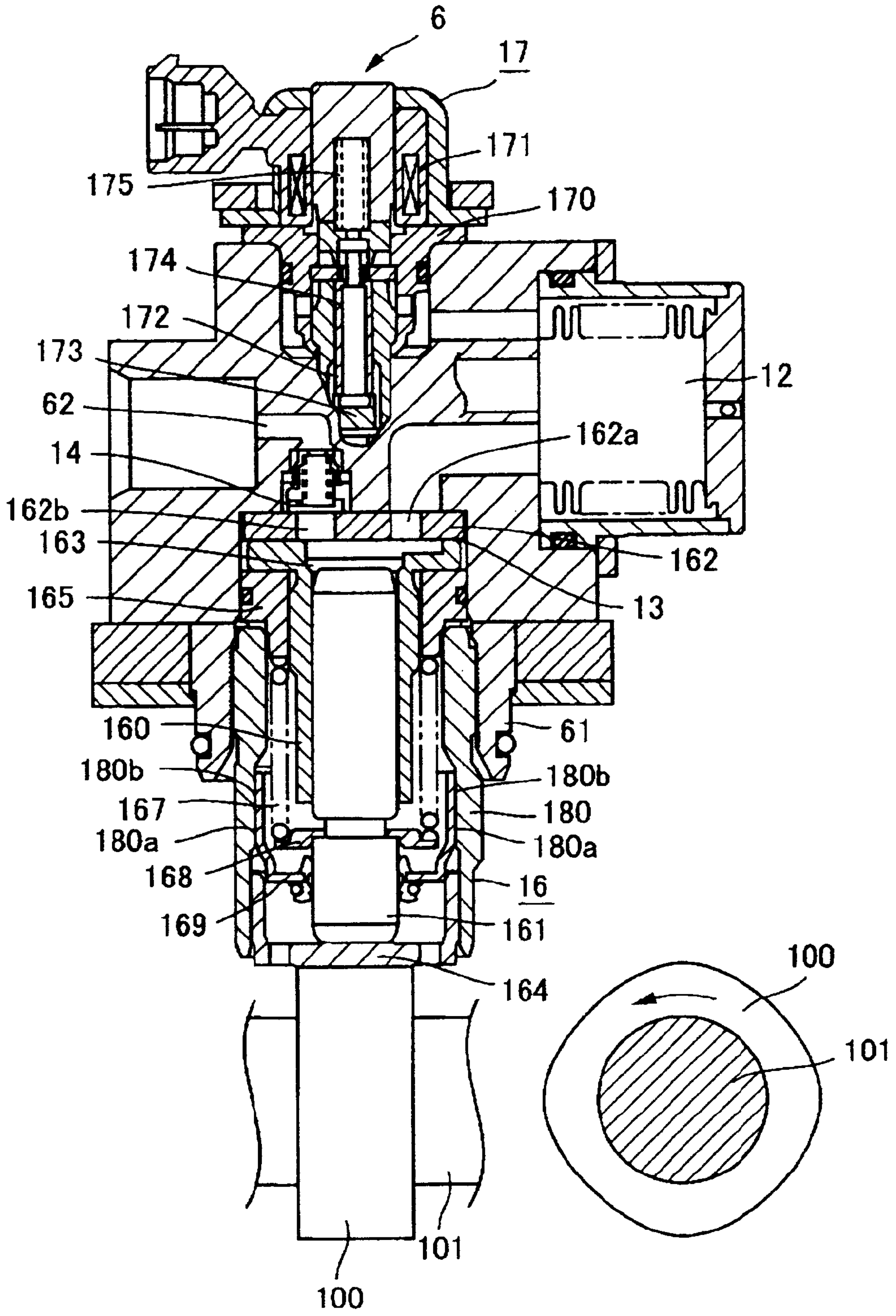
FIG. 1 is a longitudinal sectional view showing a high pressure fuel supply apparatus according to Embodiment 1 of the invention.
Figure 2:
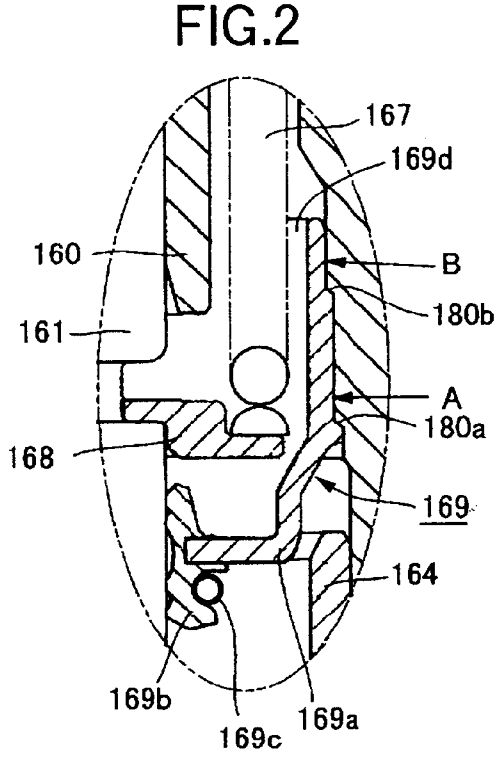
FIG. 2 is an enlarged sectional view showing the vicinity of an oil seal in a high pressure fuel pump of the high pressure fuel supply apparatus according to Embodiment 1 of the invention.
Figure 3:
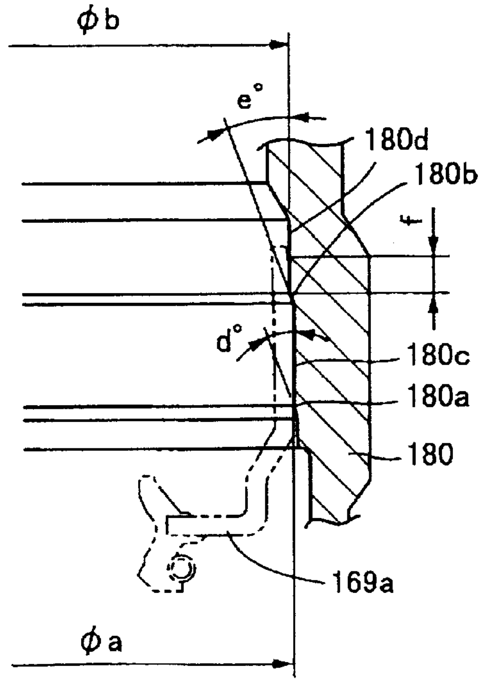
FIG. 3 is a sectional view in an abutment portion of a bolt with the oil seal in the high pressure fuel pump of the high pressure fuel supply apparatus according to Embodiment 1 of the invention.

FIG. 1 is a sectional view showing a high pressure fuel supply apparatus according to Embodiment 1 of the invention. In addition, FIG. 2 is an enlarged sectional view showing the vicinity of an oil seal in a high pressure fuel pump in FIG. 1. In addition, FIG. 3 is a sectional view in an abutment portion of a bolt against the oil seal. Incidentally, although FIGS. 2 and 3 show only the right side portion with respect to the paper plane, not to say, there is a similar structure in the left side portion with respect to the paper plane because an oil seal 169, a bolt 180, a plunger 161, and so on, illustrated here, are cylindrical respectively.

Here, a fuel supply system including this high pressure fuel supply apparatus is fundamentally similar to that in the related-art example, and its detailed description will be omitted. In addition, the configuration of an electromagnetic valve 17 is also fundamentally similar to that in the related-art example, and its detailed description will be therefore omitted. In addition, the configuration of a high pressure fuel pump 16 is fundamentally similar to that in the related-art example, except the portion which will be described below in detail. That is, according to this embodiment, the inner wall surface of the bolt 180 is formed to have a plurality of different bore diameters (ϕa and ϕb), as illustrated, in the abutment portion between the oil seal 169 and the bolt 180 as a specified member forming a part of the housing of the high pressure fuel pump. Thus, a first step 180*a* and a second step 180*b* are formed.

Figure 4:
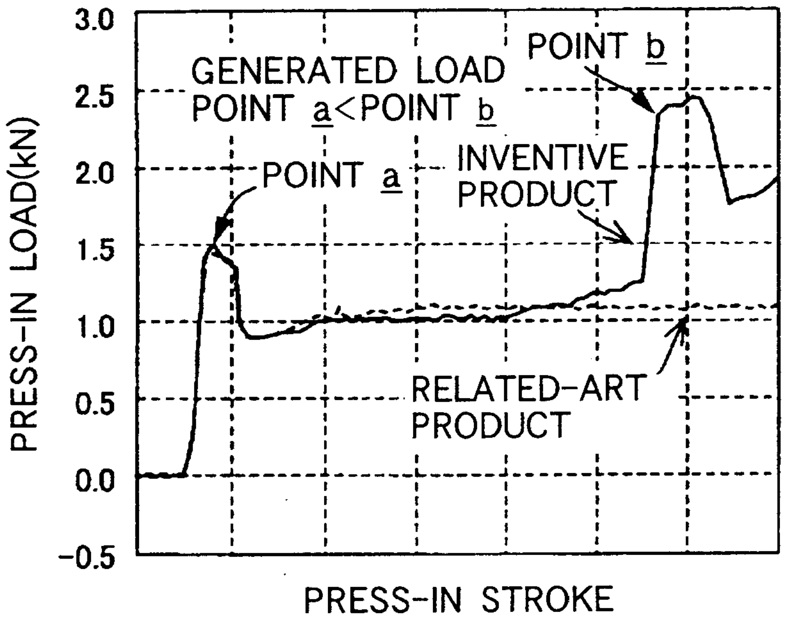
FIG. 4 is a graph showing the relationship between the press-in load and the press-in stroke of the oil seal in the high pressure fuel pump of the high pressure fuel supply apparatus according to Embodiment 1 of the invention.
Figure 5:
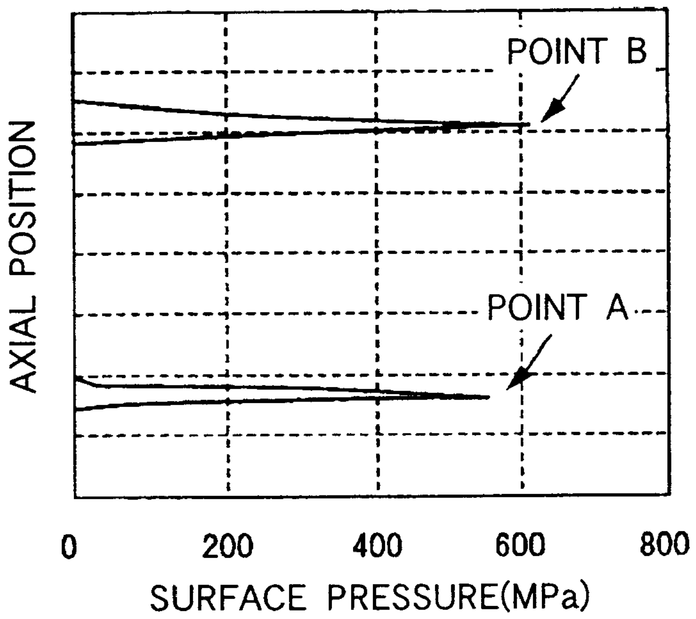
FIG. 5 is a graph showing the surface pressure distribution generated in the abutment surface between the oil seal and the bolt in the high pressure fuel pump of the high pressure fuel supply apparatus according to Embodiment 1 of the invention.
Figure 12:
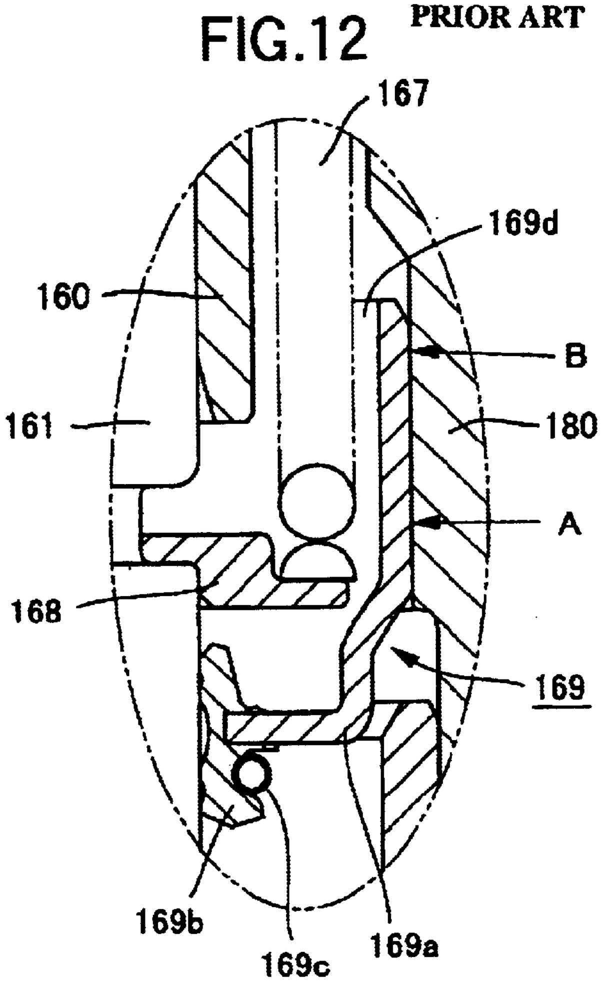
FIG.12 PRIOR ART
FIG. 12 is an enlarged sectional view showing the vicinity of an oil seal in a high pressure fuel pump of the related-art high pressure fuel supply apparatus.

FIG. 4 is a graph showing the relationship between the press-in load and the press-in stroke of the oil seal in the high pressure fuel pump of the high pressure fuel supply apparatus according to Embodiment 1 of the invention. In FIG. 4, the ordinate designates the press-in load (kN), and the abscissa designates the press-in stroke. The solid line shows the relationship in this embodiment, and the broken line shows the relationship in the related-art example (similar to that in FIG. 12). In addition, FIG. 5 is a graph showing the surface pressure distribution generated in the abutment portion between the oil seal and the bolt. In FIG. 5, the ordinate designates the axial position of the abutment portion between the oil seal 169 and the bolt 180, and the abscissa designates the surface pressure (MPa).

As shown in FIG. 4, at the beginning of press fitting of the annular portion 169*a*, that is, at the beginning (point a) of a press-in stroke, a high press-in load is generated due to the first step 180*a*. After that, the press-in load is lowered with the advance of the press fitting, but a press-in load higher than that at the point a is generated at a point b due to the second step 180*b*.

When this relationship is viewed in the surface pressure distribution shown in FIG. 5, high surface pressure is generated in the vicinity of the point A and in the vicinity of the point B in the annular portion 169*a* shown in FIG. 2, and it can be confirmed that the high surface pressure is generated in portions corresponding to the first step 180*a* and the second step 180*b*. In addition, at this time, the surface pressure in the vicinity of the point B is higher than the surface pressure in the vicinity of the point A in the abutment surface between the oil seal 169 and the bolt 180. It is proved that this is because the press-in load at the point b is higher than the press-in load at the point a in FIG. 4.

Consequently, when the annular portion 169*a* of the oil seal 169 is pressed into the inner wall surface of the bolt 180, the adhesive agent adhering to the annular portion 169*a* is peeled off by the first step 180*a*. With further press fitting, a load required for sealing can be generated when the annular portion 169*a* passes through the second step 180*b*. Accordingly, sealing can be ensured on the side of the open end 169*d* of the annular portion 169*a* so that the sealing properties of the oil seal can be improved.

Incidentally, the setting of the load required for sealing can be changed desirably by the press fitting allowances and the taper angles formed in the respective steps. In this embodiment, for example, the press fitting allowance of the first step 180*a*, that is, the difference between the outer shape of the annular portion 169*a* and the inner diameter ϕa of the inner wall surface 180*c* of the bolt 180 formed by the first step 180*a* is set to be 10–200 μm, and the taper angle (d°) of the first step 180*a* is set to be 10–30°. On the other hand, the press fitting allowance of the second step 180*b*, that is, the difference between the outer shape of the annular portion 169*a* and the inner diameter ϕb of the inner wall surface 180*d* of the bolt 180 formed by the second step 180*b* is set to be 150–300 μm, and the taper angle (e°) of the second step 180*b* is set to be 5–25°. In addition, the distance f (only the straight line portion excluding the tapered portion) between the open end 169*d* of the oil seal 169 and the second step 180*b* is set to be 1–3 mm.

Incidentally, although the first step 180*a* and the second step 180*b* are formed in the inner wall surface of the bolt 180 in Embodiment 1, three or more steps may be formed. With three or more steps, similar effect can be obtained if setting can be done so that the press-in load becomes higher in the second half of the press-in stroke of the oil seal 169 than in the first half thereof. In this case, it will go well if the steps are formed so that the point providing the highest press-in load is located in the vicinity of the open end of the annular portion 169*a*.

(Embodiment 2)

Figure 6:
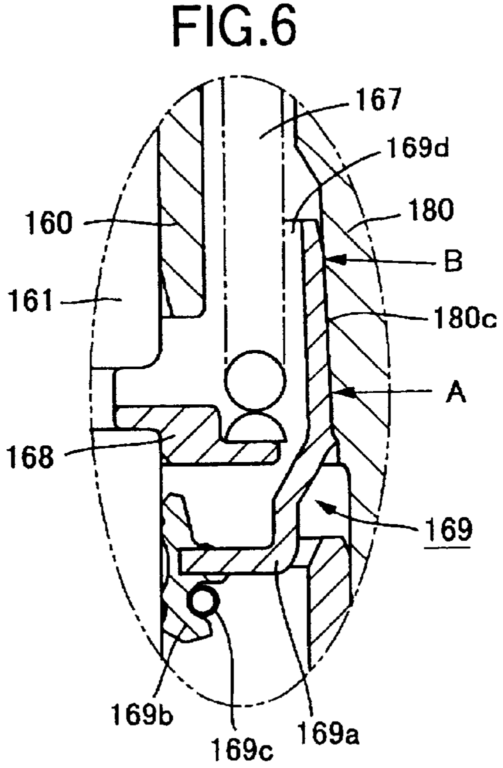
FIG. 6 is an enlarged sectional view showing the vicinity of an oil seal in a high pressure fuel pump of a high pressure fuel supply apparatus according to Embodiment 2 of the invention.
Figure 7:
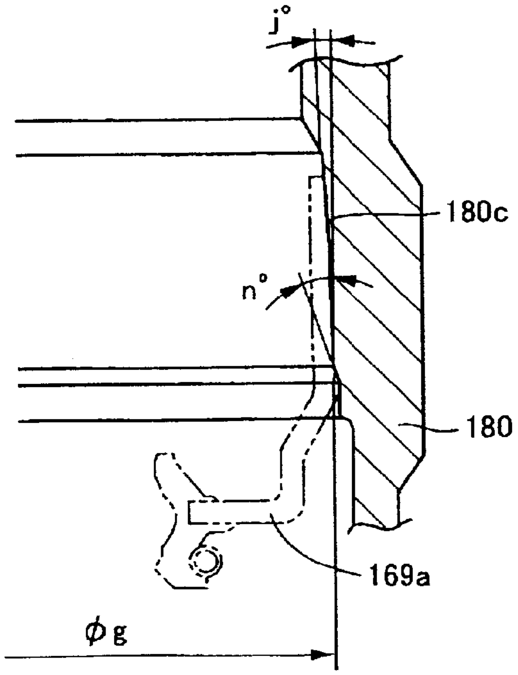
FIG. 7 is a sectional view showing an abutment portion of a bolt with the oil seal in the high pressure fuel pump of the high pressure fuel supply apparatus according to Embodiment 2 of the invention.

FIG. 6 is an enlarged sectional view showing the vicinity of an oil seal in a high pressure fuel pump of a high pressure fuel supply apparatus according to Embodiment 2 of the invention. In addition, FIG. 7 is a sectional view in an abutment portion of a bolt against the oil seal. Incidentally, although FIGS. 6 and 7 show only the right side portion with respect to the paper plane, not to say, there is a similar structure in the left side portion with respect to the paper plane because an oil seal 169, a bolt 180, a plunger 161, and so on, illustrated here, are cylindrical respectively.

In Embodiment 1, the inner wall surface of the bolt 180 was formed to have a plurality of different bore diameters in the abutment portion between the oil seal 169 and the bolt 180 so that the first step 180*a* and the second step 180*b* were arranged. However, in this embodiment, the inner wall surface of the bolt 180 is formed as a taper 180*c* whose bore diameter varies continuously as shown in FIG. 6.

Figure 8:
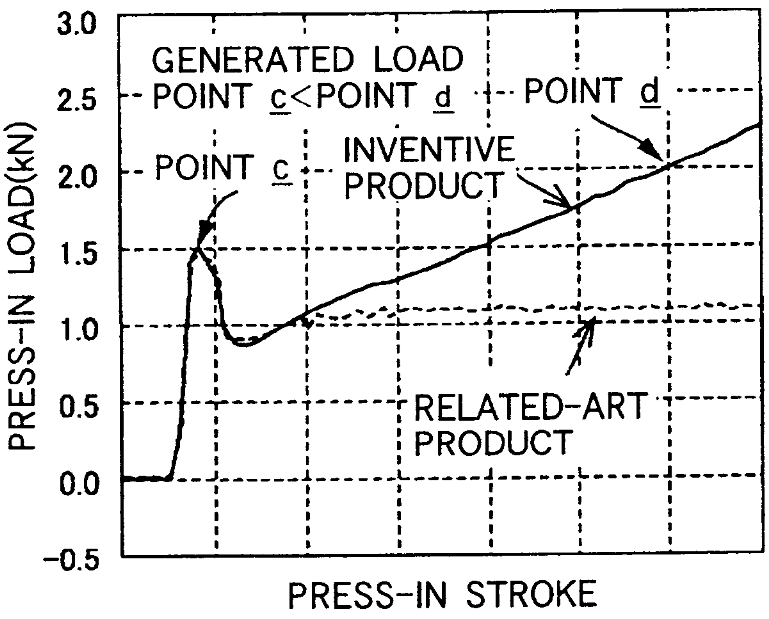
FIG. 8 is a graph showing the relationship between the press-in load and the press-in stroke of the oil seal in the high pressure fuel pump of the high pressure fuel supply apparatus according to Embodiment 2 of the invention.
Figure 9:
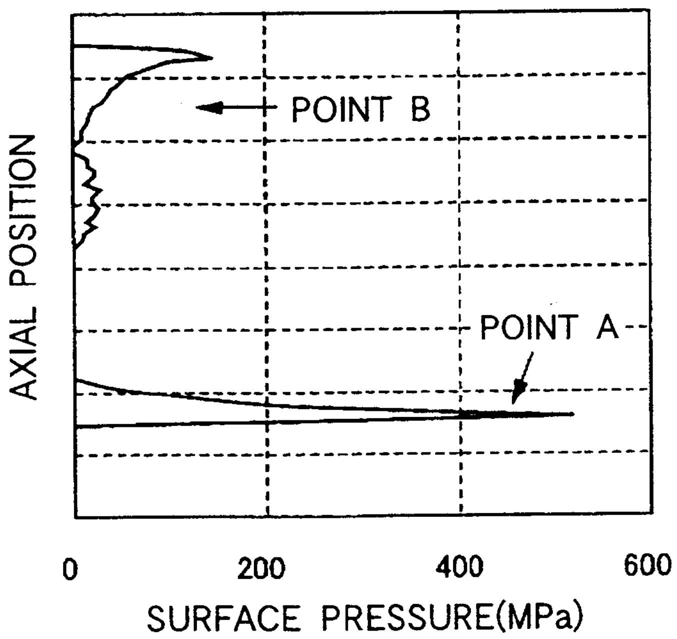
FIG. 9 is a graph showing the surface pressure distribution generated in the abutment surface between the oil seal and the bolt in the high pressure fuel pump of the high pressure fuel supply apparatus according to Embodiment 2 of the invention.
Figure 10:
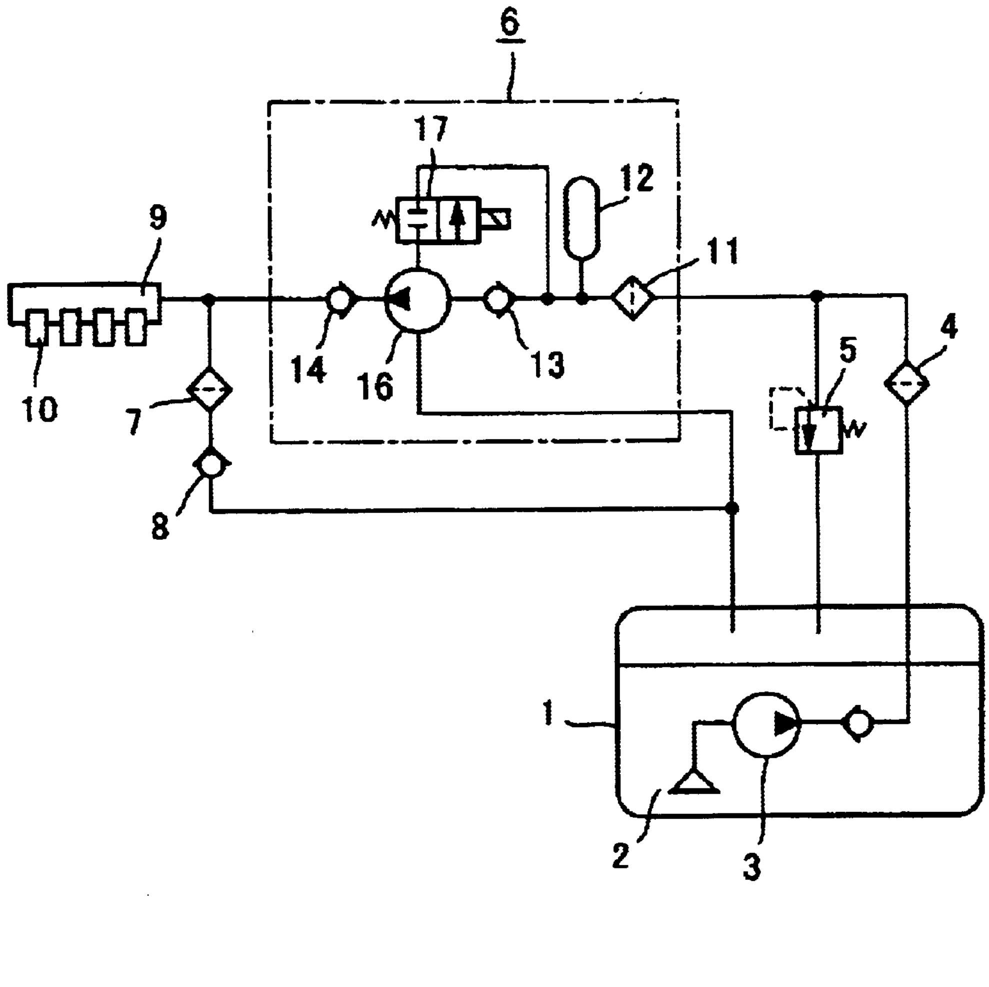
PRIOR ART FIG.10
FIG. 10 is a configuration diagram showing a fuel supply system in an internal combustion engine for a vehicle, including a related-art high pressure fuel supply apparatus.
Figure 11:
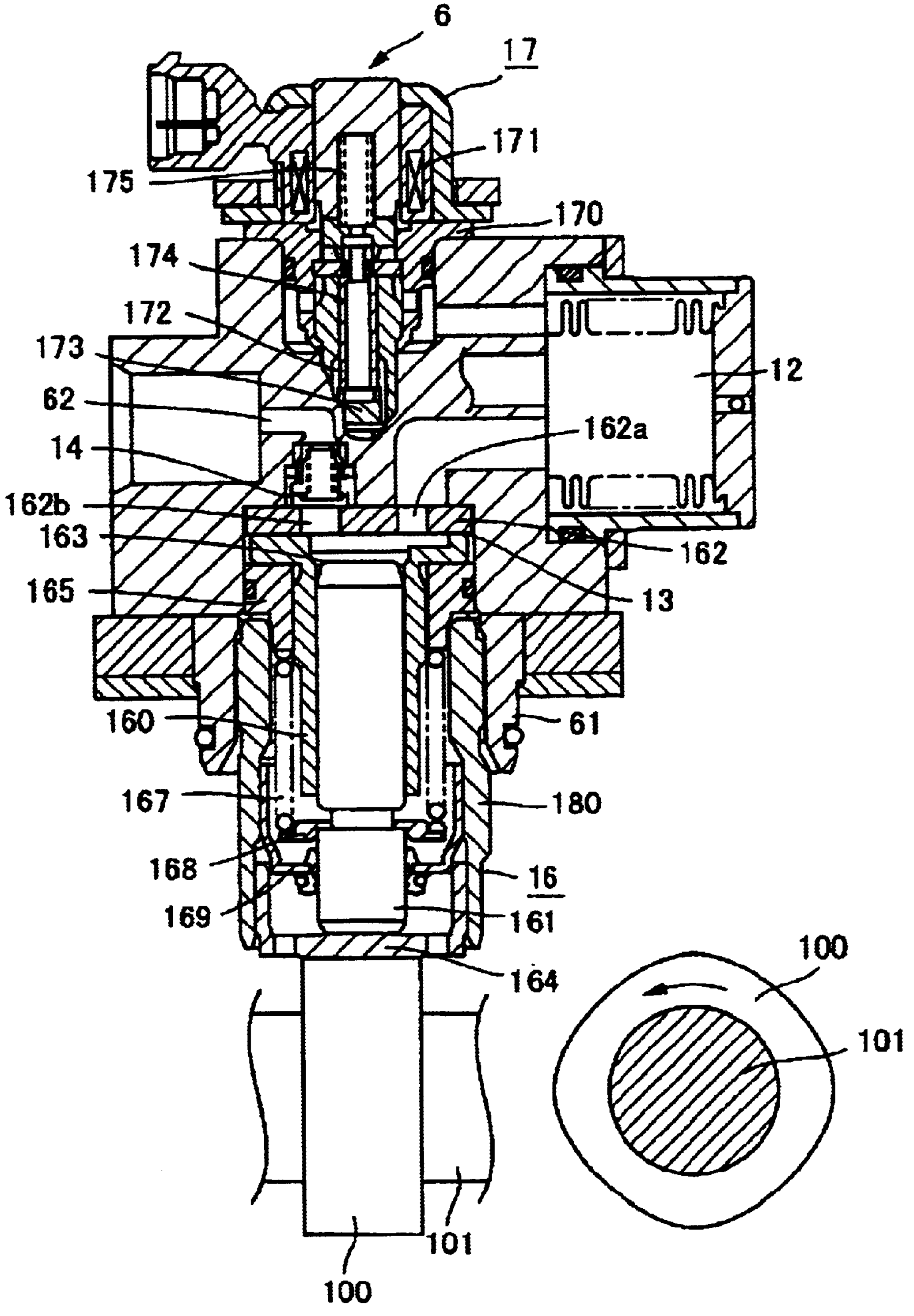
FIG.11 PRIOR ART
FIG. 11 is a longitudinal sectional view showing the related-art high pressure fuel supply apparatus.
Figure 13:
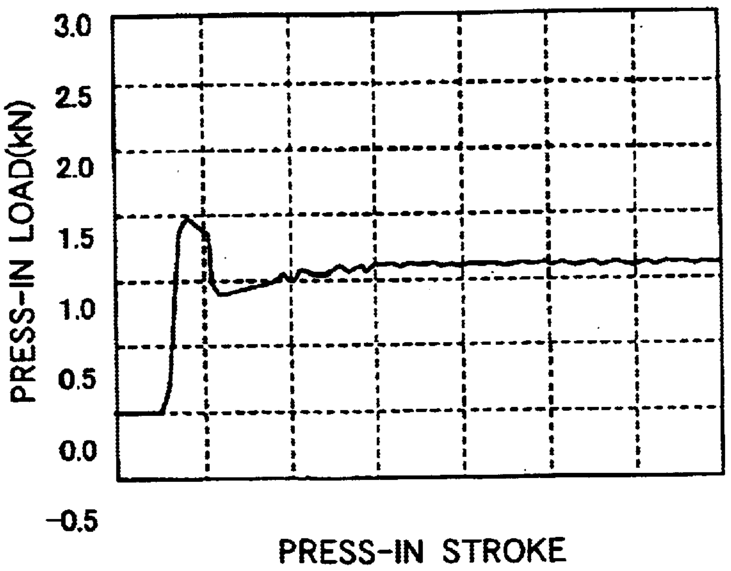
FIG.13 PRIOR ART
FIG. 13 is a graph showing the relationship between the press-in load and the press-in stroke of the oil seal in the high pressure fuel pump of the related-art high pressure fuel supply apparatus.
Figure 14:
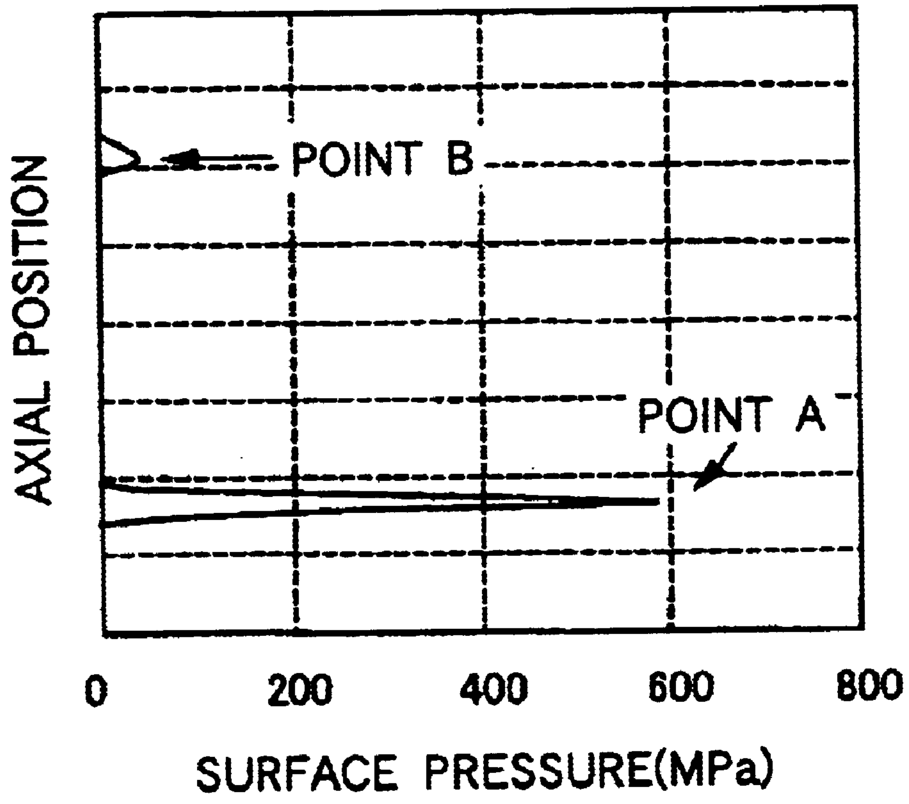
PRIOR ART FIG.14
FIG. 14 is a graph showing the surface pressure distribution generated in the abutment surface between the oil seal and the bolt in the high pressure fuel pump of the related-art high pressure fuel supply apparatus.

FIG. 8 is a graph showing the relationship between the press-in load and the press-in stroke of the oil seal in the high pressure fuel pump of the high pressure fuel supply apparatus according to Embodiment 2 of the invention. In FIG. 8, the ordinate designates the press-in load (kN), and the abscissa designates the press-in stroke. The solid line shows the relationship in this embodiment, and the broken line shows the relationship in the related-art example (similar to that in FIG. 13). In addition, FIG. 9 is a graph showing the surface pressure distribution generated in the abutment surface between the oil seal 169 and the bolt 180. In FIG. 9, the ordinate designates the axial position of the abutment portion between the oil seal 169 and the bolt 180, and the abscissa designates the surface pressure (MPa).

As shown in FIG. 8, at the beginning of press fitting of the annular portion 169*a*, that is, at the beginning (point c) of a press-in stroke, a high press-in load is generated due to the first step 180*a*. After that, the press-in load is once lowered with the advance of the press fitting, but then the press-in load increases gradually. A press-in load higher than that at the point c is generated at the last (point d) of the press-in stroke.

When this relationship is viewed in the surface pressure distribution shown in FIG. 9, high surface pressure is generated near the point A and near the point B in the annular portion 169*a* as shown in FIG. 5. Differently from that in Embodiment 1, the surface pressure in the vicinity of the point B is smaller than the surface pressure in the vicinity of the point A in this embodiment. However, the annular portion 169*a* is deformed in the inner diameter direction in the second half of the press-in stroke. Thus, if the inner wall surface of the bolt 180 is formed as the taper 180*c*, the contact area is expanded on a large scale in comparison with that in the related-art example including no taper. As a result, the adhesive agent can be prompted to be peeled off so that the sealing properties of the oil seal 169 can be improved.

Incidentally, the setting of the load required for sealing can be changed desirably by the press fitting allowance and the taper angle. In this embodiment, for example, the press fitting allowance, that is, the difference between the outer shape of the annular portion 169*a* and the inner diameter ϕg at the starting point of the taper formed in the inner wall surface of the bolt 180 is set to be 50–250 μm, the entrance taper angle (n°) is set to be 10–30°, and the taper angle (j°) is set to be 1–3°.

As described above, according to the invention, there is provided a high pressure fuel supply apparatus having: a plunger reciprocating and sliding in a sleeve of a high pressure fuel pump so as to form a fuel pressurizing chamber between the plunger and the sleeve to thereby discharge pressurized fuel; a specified member forming a part of a housing of the high pressure fuel pump; and a seal member fixed to an inner wall surface of the specified member by press fitting so as to slide on an outer circumferential wall of the plunger in accordance with reciprocating motion of the plunger to thereby seal the fuel and lubricating oil; wherein the specified member is formed so that a press-in load in a second half of a press-in stroke of the seal member is higher than that in a first half thereof in an abutment portion of the specified member against the seal member. Accordingly, there can be obtained an effect that the sealing properties of the seal member can be improved.

Further, according to the invention, the specified member is formed into a tapered shape whose bore diameter varies continuously in the abutment portion of the specified member against the seal member. Accordingly, the contact area of the abutment portion between the seal member and the specified member is expanded so that the adhesive agent can be prompted to be peeled off. Thus, there can be obtained an effect that the sealing properties of the seal member can be improved.

Further, according to the invention, the specified member is formed to have an inner wall surface constituted by a plurality of different bore diameters in the abutment portion of the specified member against the seal member. Accordingly, sealing can be ensured on the open end side of the annular portion of the seal member. Thus, there can be obtained an effect that the sealing properties of the oil seal can be improved.

Further, according to the invention, the specified member has a smallest bore diameter in the second half of the press-in stroke of the seal member in the abutment portion of the specified member against the seal member. Accordingly, sealing can be ensured on the open end side of the annular portion of the seal member. Thus, there can be obtained an effect that the sealing properties of the oil seal can be improved.

What is claimed is:

1. A high pressure fuel supply apparatus comprising:

a plunger reciprocating and sliding in a sleeve of a high pressure fuel pump so as to form a fuel pressurizing chamber between said plunger and said sleeve to discharge pressurized fuel;

a specified member forming a part of a housing of said high pressure fuel pump; and a seal member fixed to an inner wall surface of said specified member by press fitting so as to slide on an outer circumferential wall of said plunger in accordance with reciprocating motion of said plunger to seal said fuel and lubricating oil, wherein said specified member is formed so that a press-in load in a second half of a press-in stroke of said seal member is higher than a press-in load in a first half thereof in an abutment portion of said specified member against said seal member.

2. The high pressure fuel supply apparatus according to claim 1, wherein said specified member is formed into a tapered shape whose bore diameter varies continuously in said abutment portion of said specified member against said seal member.

3. The high pressure fuel supply apparatus according to claim 1, wherein said specified member is formed into a stepped shape whose inner wall surface is constituted of a plurality of different bore diameters in said abutment portion of said specified member against said seal member.

4. The high pressure fuel supply apparatus according to claim 3, wherein said specified member has a smallest bore diameter in said second half of said press-in stroke of said seal member in said abutment portion of said specified member against said seal member.

* * * * *